United States Patent
Hagiwara et al.

(10) Patent No.: US 12,249,053 B2
(45) Date of Patent: Mar. 11, 2025

(54) IMAGE PROCESSING DEVICE AND IMAGE PROCESSING METHOD

(71) Applicant: Socionext Inc., Kanagawa (JP)

(72) Inventors: Soichi Hagiwara, Yokohama (JP); Yuji Umezu, Yokohama (JP); Junzo Sakurai, Yokohama (JP)

(73) Assignee: Socionext Inc., Kanagawa (JP)

( * ) Notice: Subject to any disclaimer, the term of this patent is extended or adjusted under 35 U.S.C. 154(b) by 337 days.

(21) Appl. No.: 17/807,491

(22) Filed: Jun. 17, 2022

(65) Prior Publication Data

US 2022/0318968 A1  Oct. 6, 2022

Related U.S. Application Data

(63) Continuation of application No. PCT/JP2020/046561, filed on Dec. 14, 2020.

(60) Provisional application No. 62/954,056, filed on Dec. 27, 2019.

(51) Int. Cl.
*G06T 5/92* (2024.01)
*G06T 5/70* (2024.01)

(52) U.S. Cl.
CPC ............ *G06T 5/92* (2024.01); *G06T 5/70* (2024.01); *G06T 2207/10024* (2013.01); *G06T 2207/20224* (2013.01)

(58) Field of Classification Search
CPC ... G06T 5/92; G06T 5/70; G06T 2207/10024; G06T 2207/20224; H04N 23/843; H04N 23/85; H04N 23/88; H04N 25/136
USPC ........................................................ 382/100
See application file for complete search history.

(56) References Cited

U.S. PATENT DOCUMENTS

| | | | |
|---|---|---|---|
| 2004/0218832 A1 | 11/2004 | Luo et al. | |
| 2008/0225135 A1 | 9/2008 | Mizukura et al. | |
| 2011/0058072 A1* | 3/2011 | Wang | H04N 25/61 348/E5.079 |
| 2014/0205193 A1* | 7/2014 | Umezu | H04N 23/741 382/169 |

(Continued)

FOREIGN PATENT DOCUMENTS

| | | |
|---|---|---|
| JP | 2006-211478 | 8/2006 |
| JP | 2007-534179 | 11/2007 |

(Continued)

OTHER PUBLICATIONS

International Search Report for PCT/JP2020/046561 mailed on Feb. 22, 2021.

*Primary Examiner* — Ali Bayat
(74) *Attorney, Agent, or Firm* — IPUSA, PLLC

(57) ABSTRACT

An image processing device for performing correction processing on original image data generated by an image-capturing element configured to receive light with a plurality of pixels through a color filter including segments of a red color and at least one complementary color includes a processing circuitry being configured to perform operations including converting the original image data into primary color-based image data represented in a primary color-based color space, acquiring a statistical value of a plurality of pieces of pixel data corresponding to the plurality of pixels from the primary color-based image data, calculating a correction parameter by using the statistical value, and correcting the original image data based on the correction parameter.

11 Claims, 15 Drawing Sheets

(56) References Cited

U.S. PATENT DOCUMENTS

| | | | |
|---|---|---|---|
| 2015/0311243 A1* | 10/2015 | Jin | H01L 27/14645 |
| | | | 257/432 |
| 2016/0078638 A1* | 3/2016 | Endo | H04N 1/60 |
| | | | 382/167 |
| 2018/0338067 A1 | 11/2018 | Kuroiwa | |
| 2019/0214421 A1 | 7/2019 | Kim et al. | |
| 2020/0027386 A1* | 1/2020 | Wang | H04N 9/64 |
| 2023/0410463 A1* | 12/2023 | Zhou | G06T 7/90 |

FOREIGN PATENT DOCUMENTS

| | | |
|---|---|---|
| JP | 2011-041056 | 2/2011 |
| JP | 2012-060412 | 3/2012 |
| JP | 2013-128255 | 6/2013 |
| JP | 2014-007622 | 1/2014 |
| JP | 2015-099962 | 5/2015 |
| JP | 2018-195993 | 12/2018 |
| JP | 2019-122045 | 7/2019 |

* cited by examiner

FIG.7

| CONVERSION METHOD | ARITHMETIC EXPRESSION |
|---|---|
| RYeCy→RGB | $\begin{pmatrix} R \\ G \\ B \end{pmatrix} = \begin{pmatrix} M0 & M1 & M2 \\ M3 & M4 & M5 \\ M6 & M7 & M8 \end{pmatrix} \begin{pmatrix} Wr & 0 & 0 \\ 0 & Wy & 0 \\ 0 & 0 & Wc \end{pmatrix} \begin{pmatrix} R \\ Ye \\ Cy \end{pmatrix}$ $\quad\cdots(1)$ <br> $\underbrace{\phantom{XXXXXXXXXXXXXX}}_{\text{COLOR CORRECTION (CC)}} \underbrace{\phantom{XXXXXXXXXXXX}}_{\text{WHITE BALANCE (WB)}}$ |
| RGB→RYeCy | $\begin{pmatrix} Y \\ Cb \\ Cr \end{pmatrix} = \frac{1}{256} \begin{pmatrix} 65.738 & 129.057 & 25.064 \\ -37.945 & -74.203 & 112.0 \\ 112.0 & -93.786 & -18.214 \end{pmatrix} \begin{pmatrix} R \\ G \\ B \end{pmatrix} + \begin{pmatrix} 16 \\ 128 \\ 128 \end{pmatrix}$ $\quad\cdots(2)$ |
| RYeCy→RGB (SIMPLIFIED EXPRESSION) | $\begin{pmatrix} R \\ G \\ B \end{pmatrix} = \begin{pmatrix} 1 & 0 & 0 \\ -0.5 & 1.5 & 0 \\ 0 & -1 & 2 \end{pmatrix} \begin{pmatrix} Wr & 0 & 0 \\ 0 & Wy & 0 \\ 0 & 0 & Wc \end{pmatrix} \begin{pmatrix} R \\ Ye \\ Cy \end{pmatrix}$ $\quad\cdots(3)$ <br> $\underbrace{\phantom{XXXXXXXXXXXXXX}}_{\text{COLOR CORRECTION (CC)}} \underbrace{\phantom{XXXXXXXXXXXX}}_{\text{WHITE BALANCE (WB)}}$ |
| RGB→RYeCy (SIMPLIFIED EXPRESSION) | $\begin{pmatrix} Y \\ Cb \\ Cr \end{pmatrix} = \begin{pmatrix} 0.25 & 0.5 & 0.25 \\ 0 & -1 & 1 \\ 1 & -1 & 0 \end{pmatrix} \begin{pmatrix} R \\ G \\ B \end{pmatrix} + \begin{pmatrix} 0 \\ 128 \\ 128 \end{pmatrix}$ $\quad\cdots(4)$ |

FIG.10
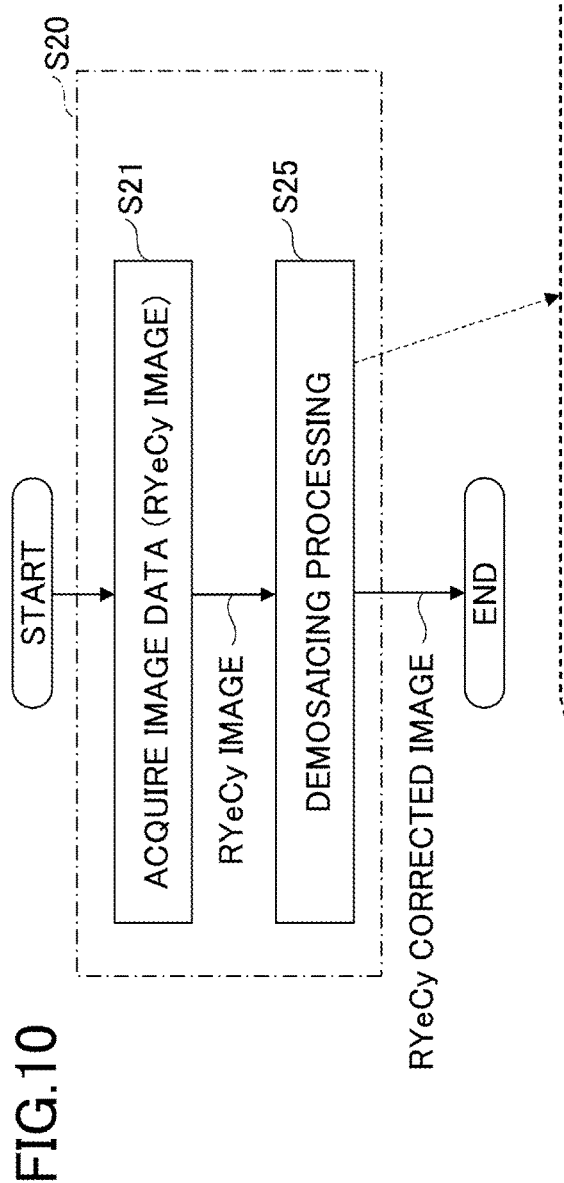
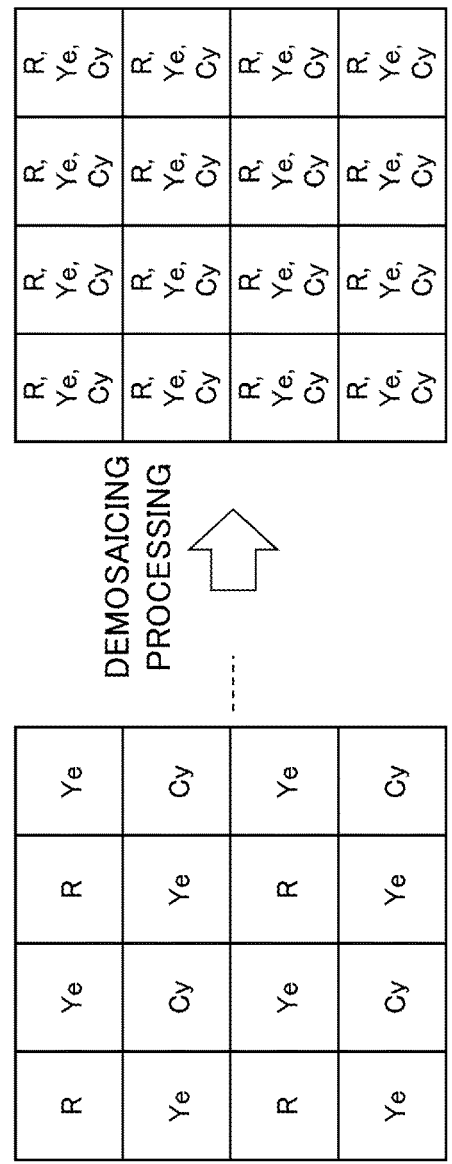

IMAGE PROCESSING DEVICE AND IMAGE PROCESSING METHOD

CROSS-REFERENCE TO RELATED APPLICATION

This U.S. non-provisional application is a continuation application of and claims the benefit of priority under 35 U.S.C. § 365(c) from PCT International Application PCT/JP2020/046561 filed on Dec. 14, 2020, designated the U.S. and claiming priority to U.S. provisional application No. 62/954,056 filed on Dec. 27, 2019. The entire contents of the foregoing applications are incorporated herein by reference.

FIELD

The present invention relates to an image processing device and an image processing method.

BACKGROUND

Image data obtained by image-capturing with a digital camera or the like is processed in various correction processing performed by an image processing device or the like in order to obtain an optimum image.

SUMMARY

According to an aspect of an embodiment, an image processing device for performing correction processing on original image data generated by an image-capturing element configured to receive light with a plurality of pixels through a color filter including segments of a red color and at least one complementary color includes a processing circuitry being configured to perform operations including converting the original image data into primary color-based image data represented in a primary color-based color space, acquiring a statistical value of a plurality of pieces of pixel data corresponding to the plurality of pixels from the primary color-based image data, calculating a correction parameter by using the statistical value, and correcting the original image data based on the correction parameter.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 7 is an explanatory diagram of an example of an arithmetic expression for mutually converting an RYeCy image and an RGB image.

FIG. 10 is a flow diagram of an example of demosaicing processing, i.e., correction processing performed in step S20 of FIG. 8.

DESCRIPTION OF EMBODIMENT

Figure 1:
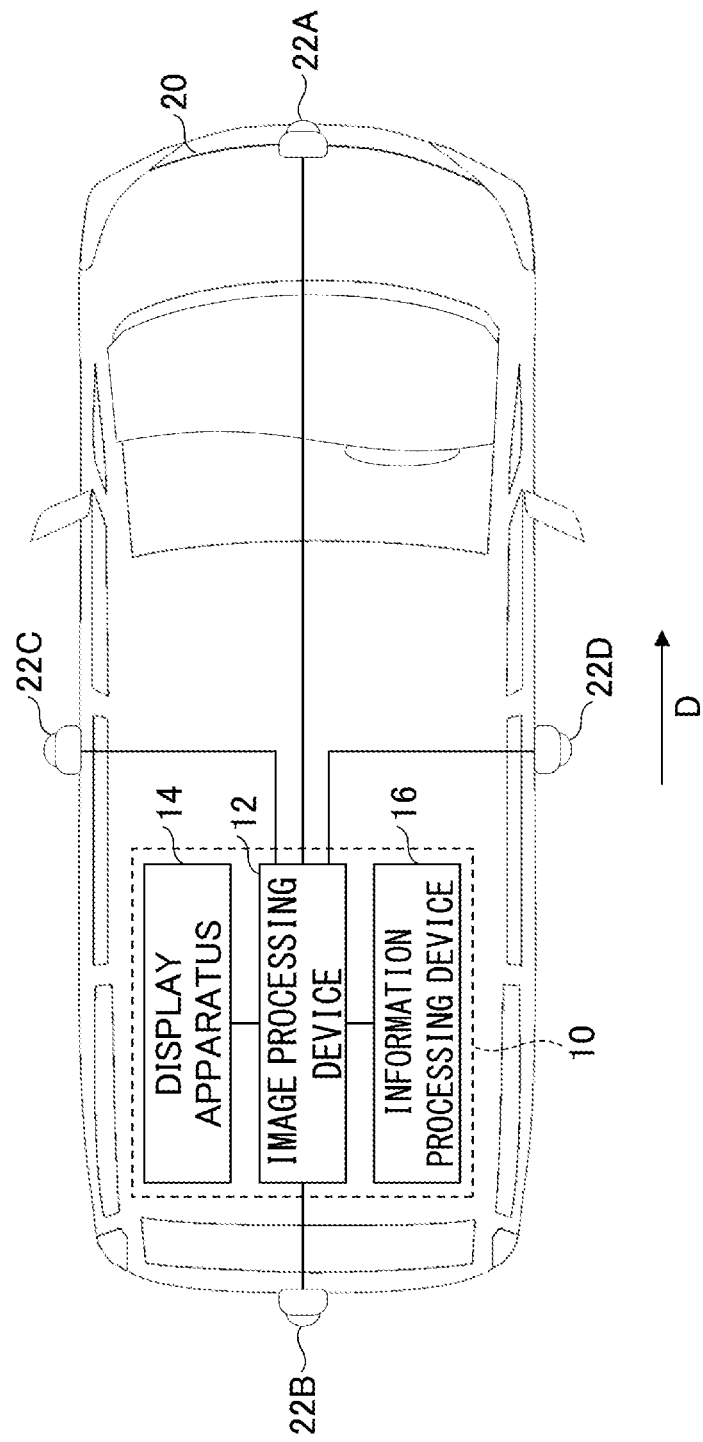
FIG. 1 is a drawing schematically illustrating an example of an image processing system including an image processing device according to a first embodiment.

For example, as described in Japanese translation of PCT Application No. 2007-534179, Japanese Patent Laid-Open No. 2015-099962, Japanese Patent Laid-Open No. 2014-007622, Japanese Patent Laid-Open No. 2018-195993, Japanese Patent Laid-Open No. 2013-128255, and Japanese Patent Laid-Open No. 2011-041056, image data obtained by image-capturing with a digital camera or the like is processed by various correction processing by an image processing device or the like in order to obtain an optimum image. For example, processing is performed to improve the brightness according to the flesh color of a person included in the image data. Alternatively, a shading correction coefficient is calculated or a white balance correction coefficient is calculated based on the statistical value of the pixel values calculated from multiple blocks into which image data is divided. This type of correction processing is often performed using image data in a color space of RGB (red, green, and blue).

Recently, there is a technique for recognizing objects around the moving object (e.g., other moving objects, traffic lights, traffic signs, road surface markings such as white lines delineating traffic lanes, pedestrians, and the like) included in an image captured by an image-capturing device such as a camera mounted on a moving object such as a car. This type of image-capturing device is desired to improve the recognition of red colors such as stop lamps, traffic lights, or regulatory signs, improve the recognition of yellow colors such as sodium lamps, or improve the light receiving sensitivity in dark places such as at night. To meet these demands, the image-capturing device may use a RYeCy (red, yellow, and cyan) filter instead of an RGB filter.

However, noise reduction processing, white balance correction, color correction processing, or the like is performed using image data in the color space of RGB. A method for performing correction processing of image data in the color space of RYeCy has not yet been suggested.

In view of the above problem, it is desired to generate a corrected image of a high image quality in correction processing of image data captured through a color filter including segments of a red color and at least one complementary color.

Embodiments will be described below with reference to drawings. In the following description, signal lines transmitting information such as signals are denoted with the same reference numerals as the names of signals. A signal line illustrated as a single line in a drawing may be actually constituted by multiple bits. Also, in the following description, image data may be simply referred to as an image.

First Embodiment

FIG. 1 is a drawing schematically illustrating an example of an image processing system including an image processing device according to the first embodiment. For example, the image processing system 10 as illustrated in FIG. 1 is provided in a moving object 20 such as an automobile. Image-capturing devices 22A, 22B, 22C, and 22D such as cameras are provided on the front, rear, left, and right sides with respect to the traveling direction D of the moving object 20. Hereinafter, in a case where the image-capturing devices 22A, 22B, 22C, and 22D are explained without distinguishing them from one another, the image-capturing devices 22A, 22B, 22C, and 22D may be collectively referred to as image-capturing devices 22.

The number of image-capturing devices 22 provided on the moving object 20 and the positions where the image-capturing devices 22 are provided are not limited to the number and the positions illustrated in FIG. 1. For example, the image-capturing devices 22 may be provided only on the front side of the moving object 20 or may be provided only on the front and rear sides. Alternatively, the image-capturing device 22 may be provided on the ceiling of the moving object 20. The moving object 20 on which the image processing system 10 is provided is not limited to an automobile, and may be, for example, a conveyance robot that operates in a factory, or may be a drone.

The image processing system 10 includes an image processing device 12, a display apparatus 14 connected to the image processing device 12, and an information processing device 16. In FIG. 1, for the ease of the explanation, the image processing system 10 is illustrated in an overlapping manner on the illustrating of the moving object 20 that is depicted as seen from above. However, the image processing device 12 and the information processing device 16 are actually implemented on a control board or the like provided in the moving object 20, and the display apparatus 14 is provided at a position that can be seen from a person aboard the moving object 20. Alternatively, the image processing device 12 may be implemented on a control board or the like as a part of the information processing device 16.

The image processing device 12 is connected to each image-capturing device 22 via signal lines or wirelessly, and obtains image data indicative of images around the moving object 20 captured by the image-capturing devices 22. The image processing device 12 performs image processing (correction processing) of the image data obtained from each image-capturing device 22, and outputs a result of the image processing to at least one of the display apparatus 14 and the information processing device 16.

The display apparatus 14 is, for example, a side-view monitor, a rear-view monitor, or a car navigation device installed in the moving object 20. Alternatively, the display apparatus 14 may be a display provided on a dashboard or the like, or may be a head-up display or the like for projecting an image onto a screen or a windshield. Still alternatively, the image processing system 10 does not have to include the display apparatus 14.

The information processing device 16 includes a computer such as a processor that performs recognition processing and the like on the basis of image data received via the image processing device 12. For example, the information processing device 16 provided on the moving object 20 performs recognition processing of image data to detect other moving objects, traffic lights, traffic signs, road surface markings such as white lines delineating traffic lanes, pedestrians, and the like and determine the situation around the moving object 20 on the basis of the detection result. The information processing device 16 may include an automatic driving control device that controls the movement, stopping, and right and left turns of the moving object 20.

Figure 2:
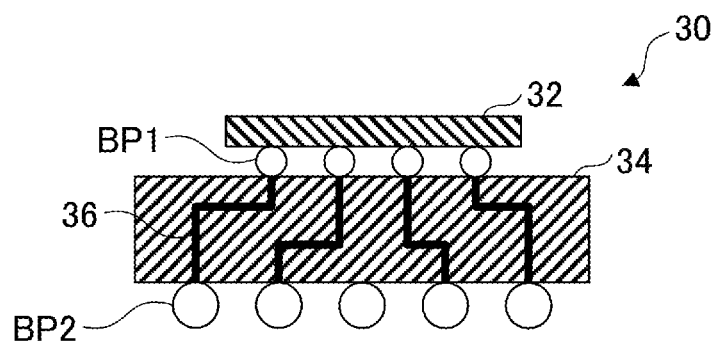
FIG. 2 is a cross-sectional view illustrating an overview of a semiconductor device on which the image processing device of FIG. 1 is implemented.

FIG. 2 is a cross-sectional view illustrating an overview of a semiconductor device 30 on which the image processing device 12 of FIG. 1 is implemented. For example, the image processing device 12 is included in a semiconductor chip 32 of the semiconductor device 30 as illustrated in FIG. 2. In the semiconductor chip 32, transistors and wirings for achieving the functions of the image processing device 12 are provided, but are not illustrated in FIG. 2.

The semiconductor chip 32 is connected to multiple wires 36 provided in the circuit board 34 via multiple bumps BP1. The multiple wires 36 are connected to bumps BP2, i.e., external connection terminals, provided on the back surface of the circuit board 34. The bumps BP2 are in turn connected to the control board or the like, so that the semiconductor device 30 is implemented on the control board or the like.

The information processing device 16 of FIG. 1 may have substantially the same configuration as the semiconductor device 30, or may have a semiconductor device that is substantially the same as the semiconductor device 30. Alternatively, both of the image processing device 12 and the information processing device 16 may be implemented in a single semiconductor device.

Figure 3:
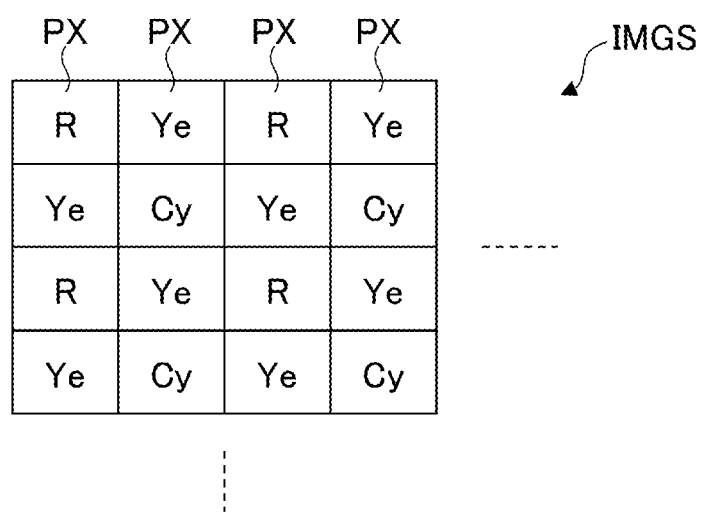
FIG. 3 is an explanatory diagram of an example of arrangement of pixels on an image sensor implemented on each image-capturing device of FIG. 1.

FIG. 3 is an explanatory diagram of an example of arrangement of pixels PX on an image sensor IMGS implemented in each image-capturing device 22 of FIG. 1. For example, the image sensor IMGS may be, but not limited to, a complementary metal oxide semiconductor (CMOS) image sensor, and is an example of an image-capturing element.

The pixels PX are arranged in a matrix shape, and each pixel PX includes a light receiving element and a color filter provided on the light receiving element. R, Ye, and Cy attached to pixels PX indicate colors of segments of a color filter. R denotes Red, Ye indicates Yellow, and Cy indicates Cyan. Specifically, each image-capturing device 22 receives light with multiple pixels through the color filter of RYeCy to generate image data. R is a primary color, and Ye and Cy are complementary colors.

In the example illustrated in FIG. 3, pixel groups, each including totally four pixels with two pixels arranged in the X direction and two pixels arranged in the Y direction, are repeatedly arranged in X and Y directions. For example, the pixel group includes a pixel R at the upper left position, a pixel Ye at the upper right position, a pixel Ye at the lower left position, and a pixel Cy at the lower right position. According to the intensities of received lights, the pixels R, Ye, and Cy output signals indicative of intensities of lights in corresponding colors.

Then, each image-capturing device 22 as illustrated in FIG. 1 generates image data indicating a view around the moving object 20 on the basis of the signals indicative of intensities of lights that are output for the pixels R, Ye, and Cy, performs image processing on the generated image data, and thereafter outputs the processed image data to the image processing device 12. The image-capturing device 22 including the image sensor IMGS as illustrated in FIG. 3 outputs image data including color information of R, Ye, and Cy.

The color filter of each pixel group of the image sensor IMGS is not limited to RYeYeCy. For example, instead of the pixel R, a pixel M of magenta may be provided, or a pixel of another red-family color may be provided. In other words, instead of a red segment of the color filter, a segment of magenta or another red-family color may be provided. The arrangement of pixels in a pixel group and the arrangement pattern of pixel groups are not limited to the arrangement and the arrangement pattern as illustrated in FIG. 3, and may be changed as necessary.

Figure 4:
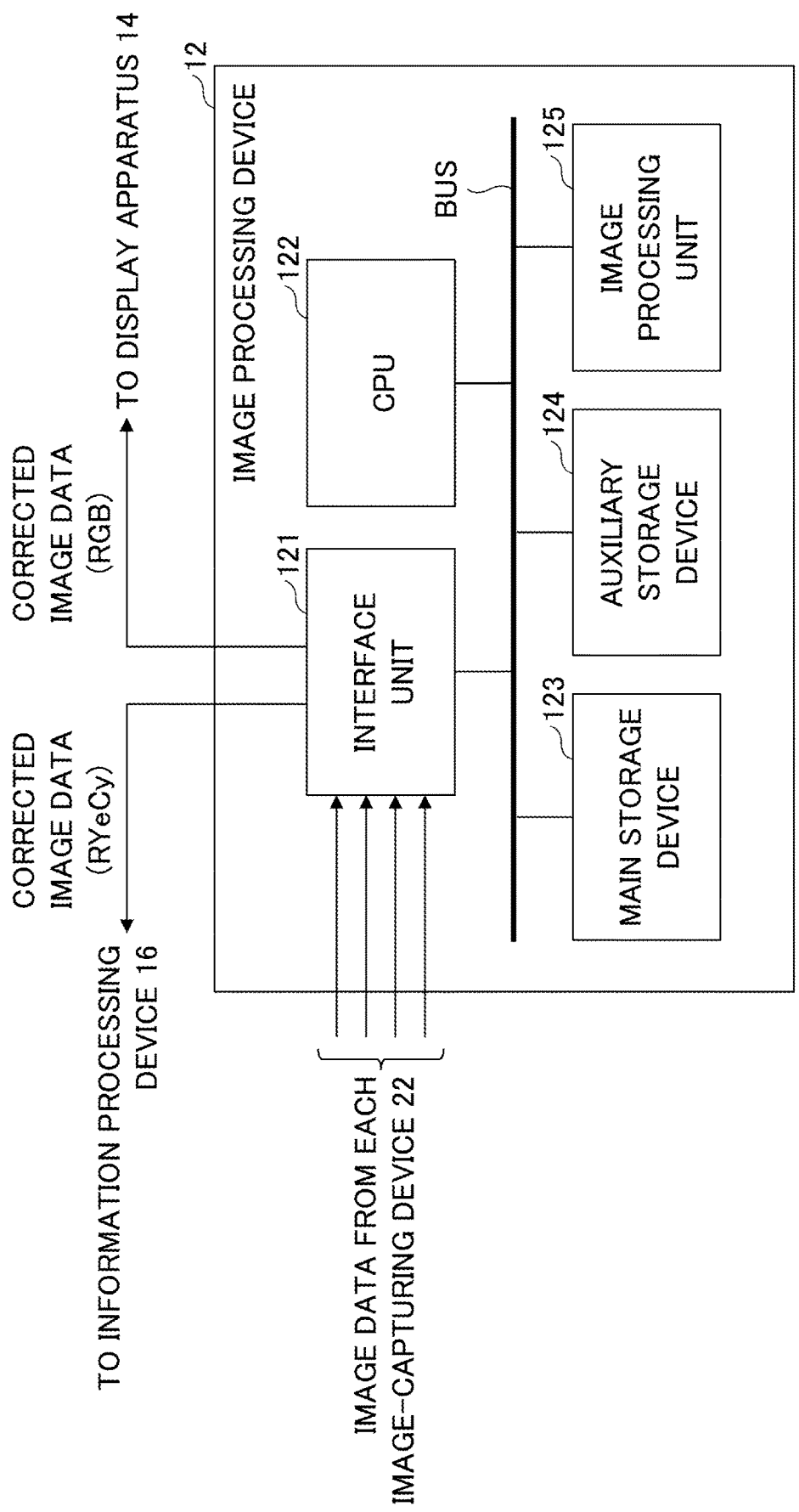
FIG. 4 is a block diagram of an example of configuration of the image processing device of FIG. 1.

FIG. 4 is a block diagram of an example of configuration of the image processing device 12 of FIG. 1. For example, the image processing device 12 includes an interface unit 121, a central processing unit (CPU) 122, a main storage device 123, an auxiliary storage device 124, an image processing unit 125, and the like, which are connected to each other via a bus.

The interface unit 121 receives image data that is output from the image-capturing devices 22 or at least one of the image-capturing devices 22. In addition, the interface unit 121 receives corrected image data generated by the image processing unit 125, and outputs the received image data to at least one of the display apparatus 14 and the information processing device 16.

For example, the CPU 122 controls the operations of the entirety of the image processing device 12 by executing the image processing program. For example, the main storage device 123 is a semiconductor memory such as a dynamic random access memory (DRAM) and the like. For example, the main storage device 123 stores an image processing program transferred from the auxiliary storage device 124 and work data used by the image processing unit 125 for image processing.

For example, the auxiliary storage device 124 is a hard disk drive (HDD), a solid state drive (SSD), or the like. For example, the auxiliary storage device 124 stores image data received from the image-capturing device 22, parameters used by the image processing unit 125 for image processing, and the image processing program.

The image processing unit 125 acquires, via the interface unit 121, image data that is output from each image-capturing device 22. The image processing unit 125 performs image processing such as conversion processing, correction processing, or the like on the acquired image data to generate corrected image data.

For example, the image processing unit 125 converts image data represented in the color space of RYeCy received from the image-capturing device 22 having the image sensor IMGS as illustrated in FIG. 3 into the color space of RGB (Red, Green, and Blue). Then, the image processing unit 125 uses the image data converted into the color space of RGB to calculate correction parameters for correction processing, and uses the calculated correction parameters to perform correction processing on the image data represented in the color space of RYeCy to generate corrected image data. Furthermore, the image processing unit 125 converts the corrected image data represented in the color space of RYeCy into the color space of RGB to generate corrected image data of RGB. The color space of RGB is an example of a primary color-based color space, and image data of RGB is an example of primary color-based image data.

The image processing device 12 outputs the corrected image data converted into the color space of RGB to the display apparatus 14 via the interface unit 121. Also, the image processing device 12 outputs the corrected image data represented in the color space of RYeCy to the information processing device 16 via the interface unit 121. Accordingly, the information processing device 16 can perform processing such as object recognition by using the corrected image data in the color space of RYeCy, not corrected image data converted from a color space other than RYeCy.

In this case, for example, a red light of a traffic light, a red light of a brake lamp of an automobile, and the like can be detected at a higher intensity by the pixel R than the intensity calculated from other pixels. Furthermore, yellow light reflected by an object illuminated by yellow light from a sodium vapor lamp or the like can be detected at a higher intensity by the pixel Ye than the intensity calculated from other pixels. As a result, a red light of a traffic light, an object illuminated by a sodium vapor lamp, and the like can be recognized with a higher accuracy.

Figure 5:
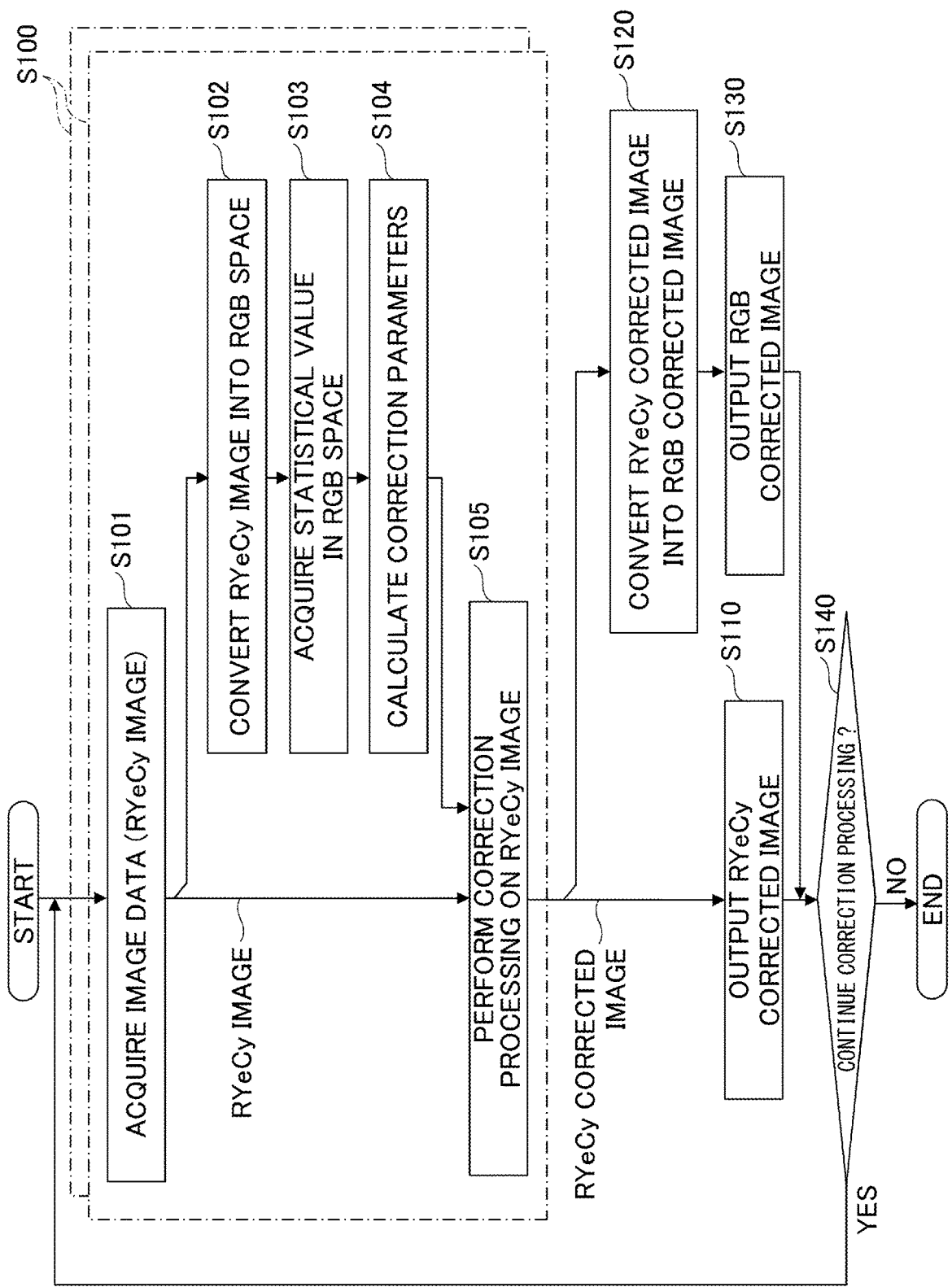
FIG. 5 is a flow diagram of an example of correction processing performed by the image processing unit of FIG. 4.

FIG. 5 is a flow diagram of an example of correction processing performed by the image processing unit 125 of FIG. 4. Specifically, FIG. 5 illustrates an example of an image processing method performed by the image processing device 12. For example, the correction processing as illustrated in FIG. 5 is performed by hardware of the image processing unit 125. The image processing unit 125 may be implemented by a field-programmable gate array (FPGA), an application specific integrated circuit (ASIC), or the like.

In this embodiment, the image processing unit 125 receives the image data represented in the color space of RYeCy that is output from the image-capturing device 22, and performs at least one type of correction processing in step S100. In this case, the image processing unit 125 converts the image data represented in the color space of RYeCy into the color space of RGB, and uses the image data represented in the color space of RGB to calculate correction parameters used for correction of the image data represented in the color space of RYeCy.

The image data acquired via the color filter of RYeCy is higher in illuminance but is lower in color identification accuracy than the image data acquired via the color filter of RGB. This is because an overlapping range between a wavelength range detected by the pixel of Ye and wavelength ranges detected by pixels of R and Cy is greater than an overlapping range among wavelength ranges detected by pixels of RGB.

In this embodiment, correction parameters used for the correction processing of the RYeCy image are calculated by using the RGB image that is higher in the color identification accuracy than the RYeCy image. The correction processing of the RYeCy image that is higher in illuminance than the RGB image is performed by using the color space of RGB, so that the image quality of the RYeCy corrected image can be improved as compared with the image quality obtained by directly correcting the RYeCy image.

An example of correction processing performed in step S100 is explained with reference to FIG. 6 to FIG. 13. Hereinafter, the image data represented in the color space of RYeCy may also be referred to as an RYeCy image, and the image data represented in the color space of RGB may also be referred to as an RGB image.

First, in step S101, the image processing unit 125 acquires, for example, an RYeCy image that is output from the image-capturing device 22. Subsequently, in step S102, the image processing unit 125 converts the RYeCy image into the RGB image represented in the color space of RGB.

Subsequently, in step S103, the image processing unit 125 calculates a statistical value (a statistical amount) of, e.g., signal values indicative of the intensities of the pixels of R, G, and B with respect to the entire range or a predetermined partial range of the RGB image. The processing of step S103 is an example of statistical acquisition processing. Subsequently, in step S104, the image processing unit 125 calculates correction parameters used for correction of the RYeCy image acquired in step S101 on the basis of the calculated statistical value. The processing of step S104 is an example of parameter calculation processing. The correction parameters calculated by the image processing unit 125 are different depending on the content of the correction processing performed in step S100.

Subsequently, in step S105, the image processing unit 125 uses the correction parameters calculated in step S104 to perform the correction processing of the RYeCy image acquired in step S101, and generates corrected image data represented in the color space of RYeCy (an RYeCy corrected image). The processing of step S105 is an example of correction processing for generating corrected image data.

The image processing unit 125 can convert the correction parameters calculated using the RGB image into correction parameters for the RYeCy image by performing, on the correction parameters, processing opposite to the processing for converting the RYeCy image into the RGB image. The conversion of the correction parameters may be performed in step S104.

Subsequently, in step S110, the image processing unit 125 outputs the corrected image data (RYeCy corrected image) corrected in step S105, as data for image processing, to, for example, the information processing device 16 of FIG. 1. Furthermore, in parallel with the processing of step S110, the image processing unit 125 converts, in step S120, the RYeCy corrected image into the RGB corrected image represented in the color space of RGB. Subsequently, in step S130, the image processing unit 125 outputs the RGB corrected image, as data for display, to, for example, the display apparatus 14 of FIG. 1.

In this manner, the RGB image that is output from the image processing unit 125 to the outside (for example, the display apparatus 14) is not the RGB image converted in step S102 but is the RGB corrected image converted from the RYeCy corrected image. Therefore, for example, this can prevent the image processing unit 125 from outputting the RGB image in which the color information used in step S100 is missing. Even in a case where the conversion processing into the RGB image in step S102 is performed using a simple matrix expression, the image processing unit 125 can output the RGB corrected image as a normal RGB image.

After steps S110 and S130, in a case where the image processing unit 125 determines to continue the correction processing in step S140, the image processing unit 125 returns to step S101 to perform at least one type of correction processing. In a case where the image processing unit 125 determines to end the correction processing in step S70, the image processing unit 125 ends the correction processing illustrated in FIG. 5. For example, in a case where the image processing unit 125 receives subsequent RYeCy image data from the image-capturing device 22, the image processing unit 125 returns to step S101 to continue the correction processing, and in a case where the image processing unit 125 does not receive RYeCy image data from the image-capturing device 22, the image processing unit 125 ends the correction processing.

Figure 6:
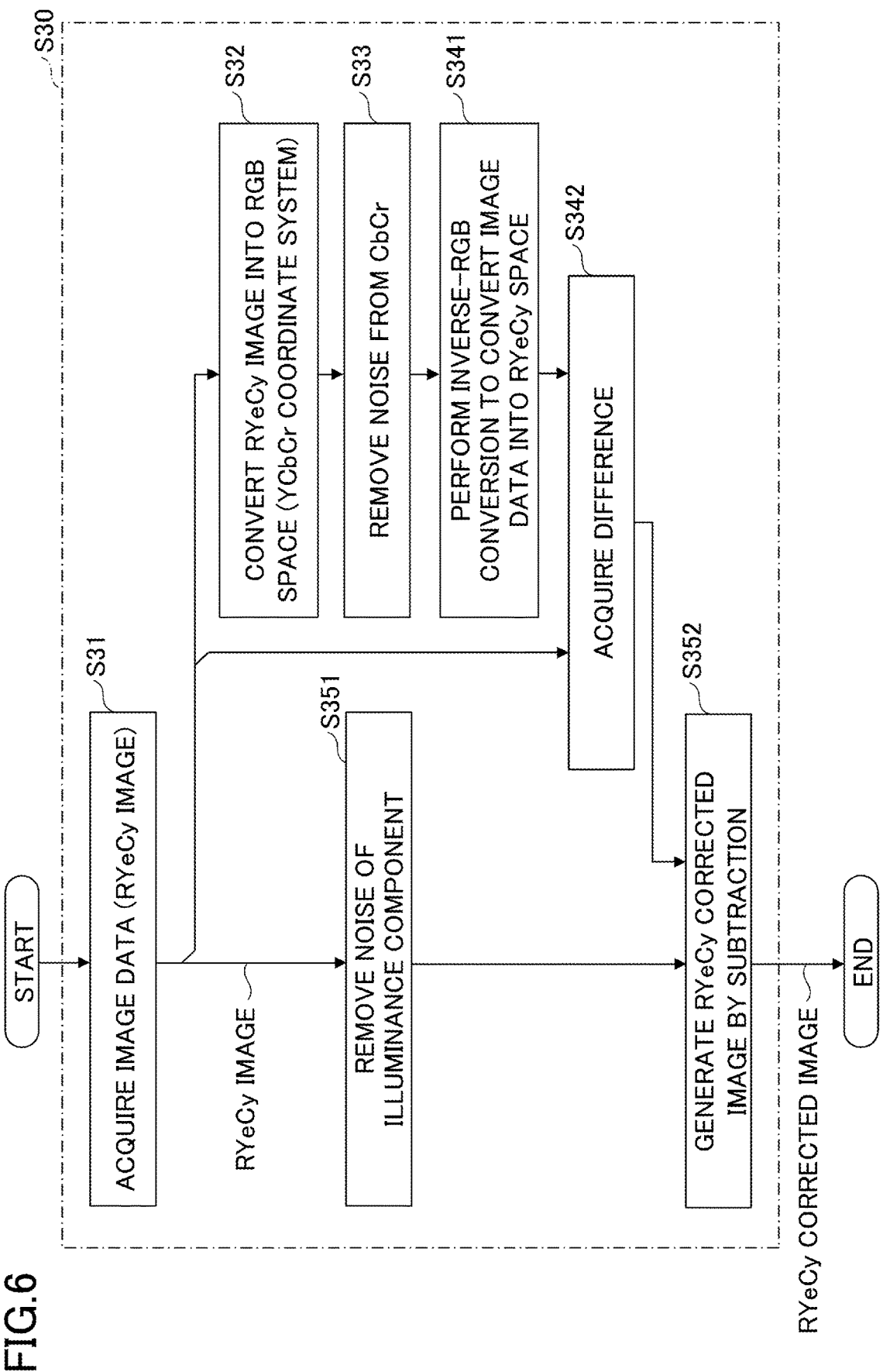
FIG. 6 is a flow diagram of an example of noise reduction processing, i.e., correction processing performed in step S100 of FIG. 5.

FIG. 6 is a flow diagram of an example of noise reduction processing, i.e., correction processing performed in step S100 of FIG. 5. Specifically, FIG. 6 illustrates an example of an image processing method performed by the image processing device 12. Step S30 of FIG. 6 corresponds to step S100 of FIG. 5. Also, steps S31, S32, and S33 of FIG. 6 correspond to steps S101, S102, and S103, respectively, of FIG. 5. Steps S341 and S342 of FIG. 6 correspond to step S104 of FIG. 5. Steps S351 and S352 of FIG. 6 correspond to step S105 of FIG. 5.

In step S31, for example, the image processing unit 125 acquires an RYeCy image that is output from the image-capturing device 22. Subsequently, in step S32, the image processing unit 125 converts the RYeCy image into an RGB image represented in the color space of RGB (the YCbCr coordinate system). In the YCbCr coordinate system, the image data of the pixels are represented by illuminance information Y and color difference information Cb, Cr. The image processing unit 125 may convert the RYeCy image into a color space of Lab.

The conversion into the RGB image may be performed by a matrix operation according to the specification, and may be performed by a simplified matrix expression. The quasi-RGB image converted by the simplified matrix expression is low in color reproducibility but on the other hand, is capable of reducing noise of the RGB components. The RGB image generated in step S31 is used to remove noise, and is not used for displaying on the display apparatus 14, and therefore, a low color reproducibility does not cause any problem.

Furthermore, when the simplified matrix expression is used, the load of processing performed by the image processing unit 125 can be reduced. Accordingly, the processing time for the correction processing can be reduced, and the power consumption of the image processing unit 125 can be reduced. The simplified matrix expression is explained with reference to FIG. 7.

Subsequently, in step S33, the image processing unit 125 performs noise reduction processing (NR) on color difference information Cb, Cr of the image of the YCbCr coordinate system converted in step S32. In other words, the image processing unit 125 acquires the color difference information Cb, Cr from which noise is removed as a statistical value (a statistical amount). Color noise can be effectively removed by removing noise of the color difference information Cb, Cr that does not include the illuminance information Y and that is close to the visual characteristics.

Subsequently, in step S341, the image processing unit 125 performs inverse-conversion, into the RYeCy space, on the image data of the RGB space from which the noise of the color difference information Cb, Cr is removed, thus converting the image data into the actual color space. Accordingly, the RYeCy image accurately reproducing the color components can be generated. Furthermore, an occurrence of failure such as excessively erasing a particular color when reducing noise can be alleviated.

Subsequently, in step S342, the image processing unit 125 acquires a difference between the RYeCy image from which the color noise is removed, obtained in the inverse-conversion in step S341, and the RYeCy image acquired in step S31. Accordingly, the image processing unit 125 can acquire, as a difference, the component of color noise. The component of color noise that is the difference is an example of a correction parameter.

In parallel with the processing of steps S32, S33, S341, and S342, the image processing unit 125 performs step S351. In step S351, the image processing unit 125 uses the RYeCy image to remove noise of the illuminance component. Because step S351 is performed on the RYeCy image, the noise reduction performance can be increased as compared with the case where noise reduction processing is performed on the RGB image. Step S351 may be performed after step S352. When the noise of the illuminance component is low, step S351 may be omitted.

Subsequently, in step S352, the image processing unit 125 subtracts the component of the color noise obtained in step S342 from the RYeCy image from which the noise of the illuminance component is removed in step S351. Then, the image processing unit 125 generates, through subtraction, the RYeCy corrected image that is the RYeCy image from which noise is removed, and ends the processing as illustrated in FIG. 6. Thereafter, the image processing unit 125 performs steps S110 and S120 as illustrated in FIG. 5.

FIG. 7 is an explanatory diagram of an example of an arithmetic expression for mutually converting between an RYeCy image and an RGB image. Specifically, FIG. 7 illustrates an example of arithmetic expression in a case where the RYeCy image and the RGB image are mutually color-converted. FIG. 7 illustrates two arithmetic expressions (1) and (3) converting the RYeCy image into the RGB image and two arithmetic expressions (2) and (4) converting the RGB image into the RYeCy image.

For example, the arithmetic expressions (1) and (3) are used in steps S102 and S120 illustrated in FIG. 5, step S32 illustrated in FIG. 6, or processing for converting the RYeCy image into the RGB image, explained later. Also, the arithmetic expressions (2) and (4) are used in step S34 illustrated in FIG. 6 or processing for converting the RGB image into the RYeCy image, explained later.

The arithmetic expression (1) is a general formula for converting the RYeCy image into the RGB image. For example, in the conversion from the RYeCy image into the RGB image, white balance WB and color correction CC are applied. The values used in the white balance WB and the color correction CC are dynamically calculated so that, for example, the color of an image that is output in auto white balance (AWB) processing becomes appropriate.

The arithmetic expression (2) is an expression for converting the RGB image into the RYeCy image. The arithmetic expression (2) is an expression defined by the specification BT.601 of ITU-R (International Telecommunication Union Radiocommunication Sector). The values included in the expression used for conversion from the RGB image to the RYeCy image may be values other than the values illustrated in the arithmetic expression (2) of FIG. 7.

In the color conversion method using the arithmetic expressions (1) and (2), a more accurate operation can be performed than in the case where the arithmetic expressions (3) and (4) are used, and accordingly, the color conversion can be performed with a higher accuracy.

In the simplified expression, the load of processing decreases as compared with the case where the arithmetic expressions (1) and (2) are used, and therefore, the cost of calculation decreases. When the arithmetic expression (4) is expanded, "Y=0.25R-0.25R+0.75Ye−0.25Ye+0.5Cy=0.5Ye+0.5Cy" is obtained. Therefore, Y is a simple average value of Ye and Cy, so that the Y component including less noise is output.

Figure 8:
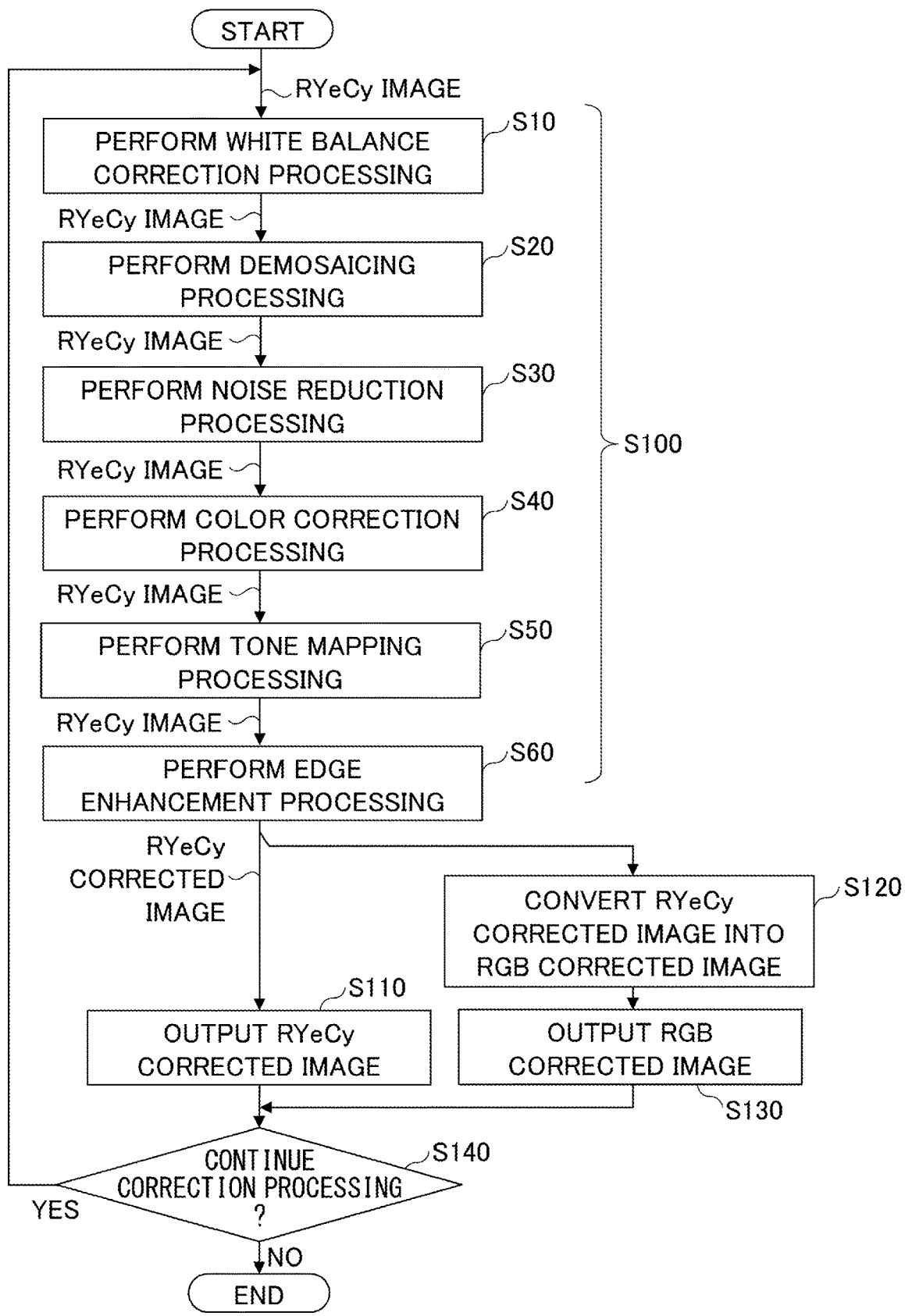
FIG. 8 is a flow diagram of another example of processing performed by the image processing unit of FIG. 4.

FIG. 8 is a flow diagram of another example of processing performed by the image processing unit 125 of FIG. 4. Specifically, FIG. 8 illustrates an example of an image processing method performed by the image processing device 12. In FIG. 8, substantially the same processing as the processing of FIG. 5 is denoted with the same reference numerals, and detailed explanation thereabout is omitted. Steps S110, S120, S130, and S140 in FIG. 8 are substantially the same processing as steps S110, S120, S130, and S140 of FIG. 5. Steps S10, S20, S30, S40, S50, and S60 of FIG. 8 are processing corresponding to step S100 of FIG. 5. Specifically, in this embodiment, multiple types of correction processing are performed successively.

In step S10, the white balance correction processing is performed, and in step S20, the demosaicing processing is performed. In step S30, the noise reduction processing is performed, and in step S40, the color correction processing is performed. In step S50, the tone mapping processing is performed, and in step S60, the edge enhancement processing is performed.

The noise reduction processing in step S30 is the same as the noise reduction processing explained with reference to FIG. 6. The image processing unit 125 may perform at least one of steps S10, S20, S30, S40, S50, and S60. The order of execution of steps S10, S20, S30, S40, S50, and S60 may be switched. The correction processing that is performed second or thereafter receives, as the original image data, the RYeCy corrected image generated in the image processing that is performed immediately before the correction processing that is performed second or thereafter.

In a case where the white balance correction processing as illustrated in step S10 is performed in step S100 as illustrated in FIG. 8, the white balance correction processing included in the arithmetic expressions (1) and (3) of FIG. 7 does not have to be performed in the individual conversion processing into the RGB image. For example, the individual conversion processing into the RGB image is step S102 of FIG. 5, step S32 of FIG. 6, and the like.

Figure 9:
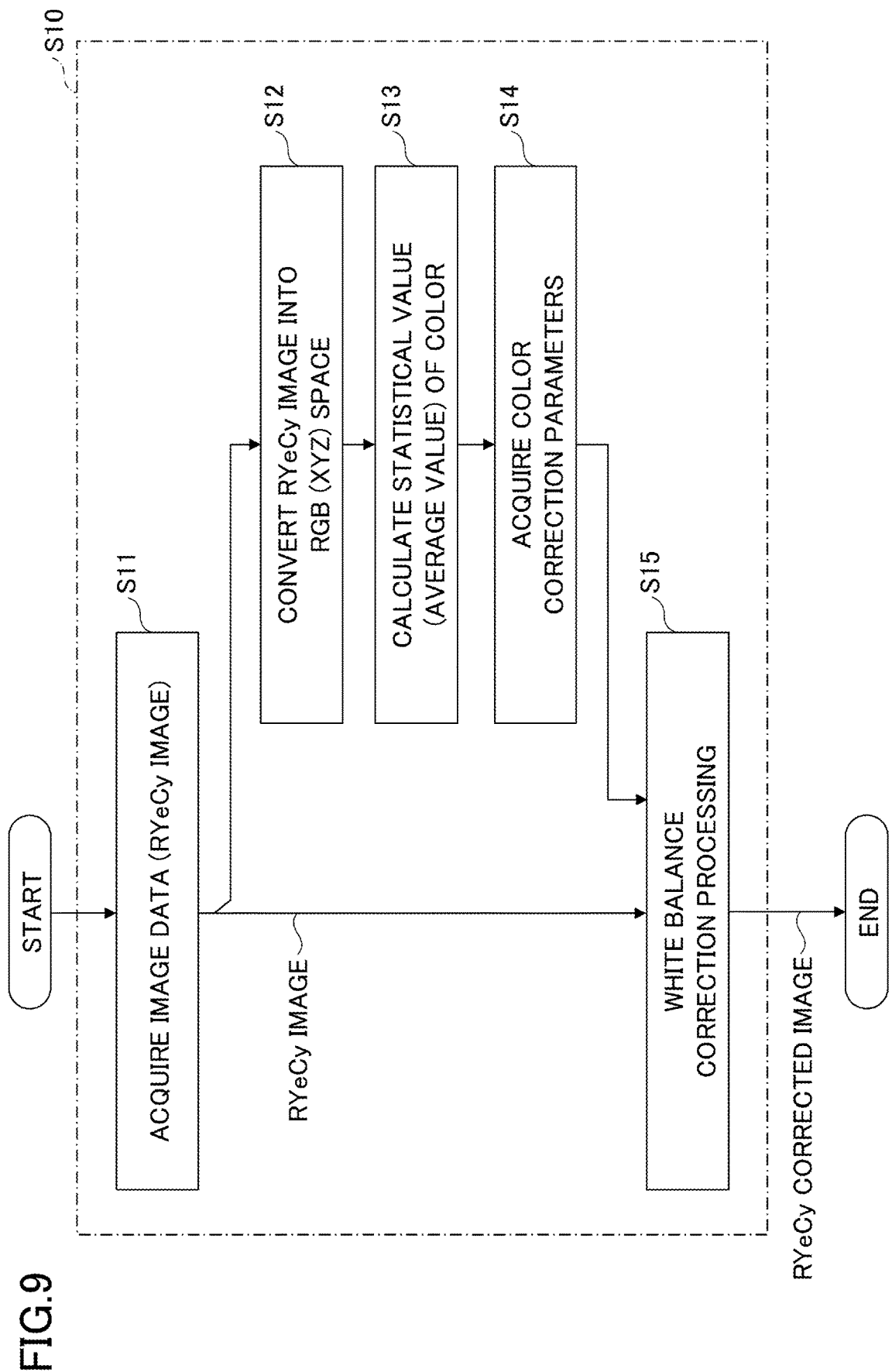
FIG. 9 is a flow diagram of an example of white balance correction processing, i.e., correction processing performed by step S10 of FIG. 8.

FIG. 9 is a flow diagram of an example of white balance correction processing, i.e., correction processing performed by step S10 of FIG. 8. Steps S11, S12, S23, S14, and S15 of FIG. 9 correspond to steps S101, S102, S103, S104, and S105, respectively, of FIG. 5.

In the white balance correction processing, as shown in the arithmetic expressions (1) and (3) of FIG. 7, the color is corrected by applying gains to R, Ye, and Cy. Where the correction parameters are denoted as Wr, Wy, and Wc, image data R', Ye', Cy' on which the white balance correction processing is performed can be calculated by "R'=WrR", "Ye'=WyYe", and "Cy'=WcCy", respectively.

For example, the correction parameters Wr, Wy, and Wc are calculated on the basis of the statistical value of the image by the auto white balance (AWB) processing. For example, the image processing unit 125 calculates the average value of the pixel values in an area that is considered to be an achromatic color in the image, and derives the correction parameters Wr, Wy, and Wc so that the average value thereof correctly becomes an achromatic color.

In step S11, the image processing unit 125 acquires the RYeCy image that is output from the image-capturing device 22, or the RYeCy corrected image that is processed in the correction processing of the previous stage. In the following explanation, the RYeCy corrected image which is acquired from the previous stage and on which the correction processing has not yet been performed is referred to as an RYeCy image.

Subsequently, in step S12, the image processing unit 125 converts the RYeCy image into the color space of RGB. At this occasion, the image processing unit 125 may convert the RYeCy image into the color space of RGB according to the specification, or may convert the RYeCy image into the color space of RGB by a simplified arithmetic expression.

Subsequently, in step S13, the image processing unit 125 uses the color space of RGB converted in step S12 to calculate a statistical value (an average value) of the color. With the image on which the white balance correction processing has not yet been performed, accurate conversion into the RGB space is difficult, and therefore, the RYeCy image may be converted into an XYZ color space derived by calibration performed in advance.

Subsequently, in step S14, the image processing unit 125 uses the statistical value derived in step S13 to acquire color correction parameters used for correction of the color. The color correction parameters acquired in step S14 are an example of a first color correction parameter. Subsequently, in step S15, the image processing unit 125 performs the white balance correction processing by using the color correction parameters acquired in step S14, generates the RYeCy corrected image, and ends the processing as illustrated in FIG. 9.

The color correction parameters for the white balance correction processing is derived by using the image data of the RGB space, so that in a case where the RYeCy corrected image is generated, the color correction parameters can be derived to display on the display apparatus 14 or the like the image that appears to be correct in color in an averaged manner.

FIG. 10 is a flow diagram of an example of demosaicing processing, i.e., correction processing performed in step S20 of FIG. 8. The demosaicing processing can be performed without converting the RYeCy image into the RGB image. Therefore, in step S20, only step S21 corresponding to step S101 of FIG. 5 and step S25 corresponding to step S105 of FIG. 5 are performed.

In step S21, the image processing unit 125 acquires the RYeCy image that is output from the image-capturing device 22 or the RYeCy corrected image that is processed in the correction processing of the previous stage. Subsequently, in step S25, the image processing unit 125 generates the RYeCy corrected image by performing the demosaicing processing on the RYeCy image acquired in step S21, and ends the processing as illustrated in FIG. 10.

In the demosaicing processing, for example, as illustrated in FIG. 3, the image processing unit 125 performs, in a case where the pixels of R, Ye, and Cy are arranged in the Bayer pattern, processing of interpolating pixel data of a pixel by using pixel data of pixels of the same color around the pixel in question to derive pixel data of R, Ye, and Cy with respect to each pixel. The demosaicing processing of the image sensor IMGS including pixels of RYeYeCy arrangement can be performed by using demosaicing processing of the image sensor IMGS having the Bayer pattern including pixels of RGGB arrangement.

Figure 11:
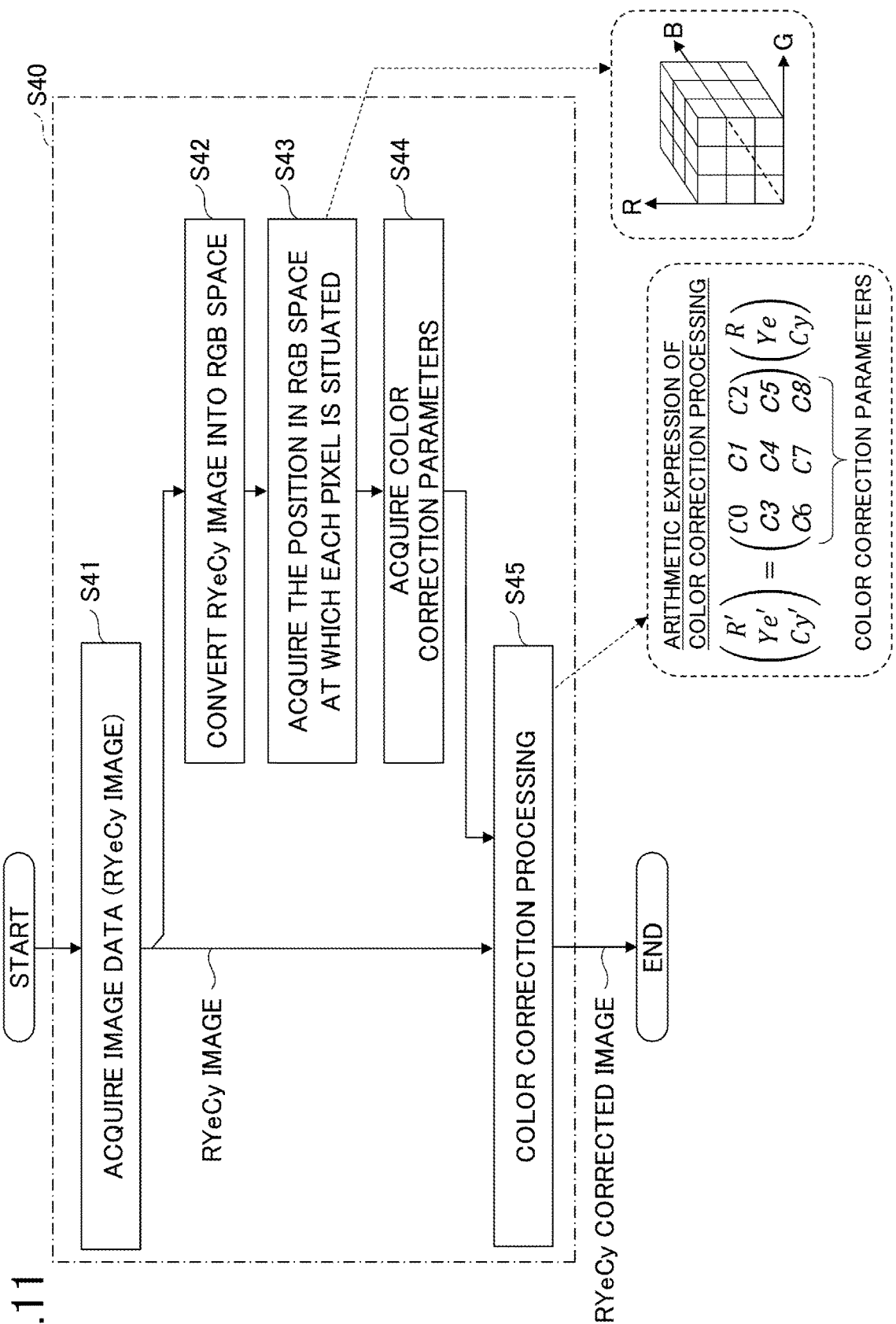
FIG. 11 is a flow diagram of an example of color correction processing, i.e., correction processing performed in step S40 of FIG. 8.

FIG. 11 is a flow diagram of an example of color correction processing, i.e., correction processing performed in step S40 of FIG. 8. Steps S41, S42, S43, S44, and S45 of FIG. 11 correspond to steps S101, S102, S103, S104, and S105, respectively, of FIG. 5.

First, in step S41, the image processing unit 125 acquires the RYeCy image that is output from the image-capturing device 22 or the RYeCy corrected image that is processed in the correction processing of the previous stage. Subsequently, in step S42, the image processing unit 125 converts the RYeCy image into the color space of RGB.

Subsequently, in step S43, the image processing unit 125 uses the color space of RGB converted in step S42 to determine the position in the RGB space at which the pixel value of each pixel is situated. Subsequently, in step S44, the image processing unit 125 acquires the applicable color correction parameters on the basis of the position where each pixel is situated that is derived in step S43. The color correction parameters acquired in step S44 are an example of a second color correction parameter.

Subsequently, in step S45, the image processing unit 125 uses the color correction parameters acquired in step S44 to perform the color correction processing of the RYeCy image, generates the RYeCy corrected image, and the processing as illustrated in FIG. 11. The RGB image is used to confirm the position where each pixel is situated in the RGB space, so that the color correction parameters according to the visual characteristics can be acquired, and the color correction processing more suitable for the acquired color correction parameters can be performed.

In a case where the color correction parameters are set for R data, G data, and B data of all the pixels, the amount of data becomes enormous, and therefore, the data may be interleaved in a lattice manner, and the color correction parameters may be acquired with respect to only the crossing points of the lattice. With respect to pixels other than pixels at the lattice points, for example, the color correction parameters may be acquired by performing interpolating with linear interpolation processing. Accordingly, the amount of data processed in the color correction processing can be reduced, and the load of processing performed by the image processing unit 125 can be alleviated.

When the lattice interleaving is performed with R, Ye, and Cy, the processing is performed in the space that is warped with respect to the RGB space, and therefore, it may be impossible to perform the interpolation processing as intended. However, as illustrated in FIG. 11, when the data is interleaved in a lattice manner after the RYeCy space is converted into the RGB space, the interpolation processing can be performed as intended, and the correct color correction parameters can be acquired. For example, a matrix of three rows and three columns applied to RYeCy is used as the color correction parameters.

Figure 12:
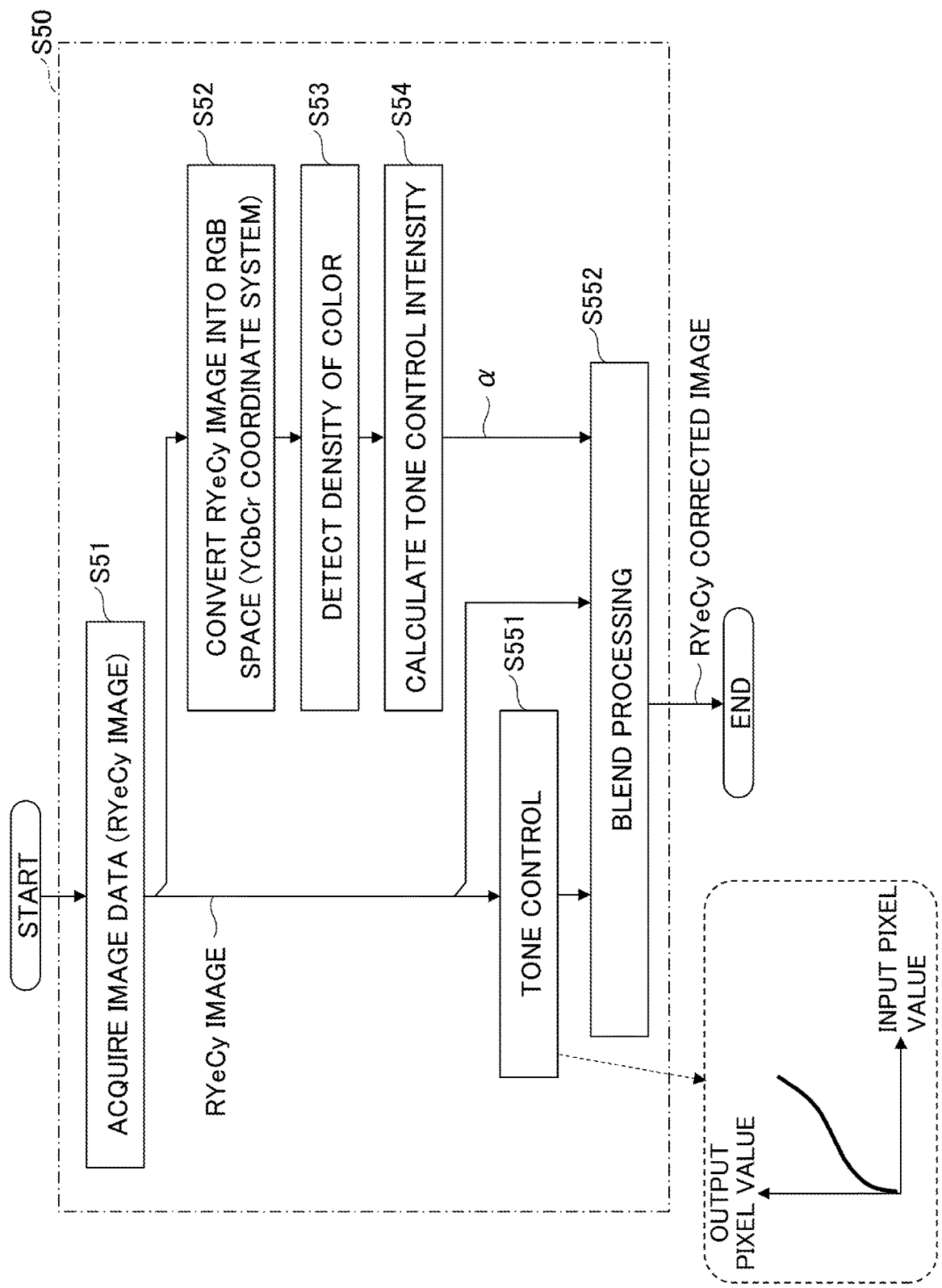
FIG. 12 is a flow diagram of an example of tone mapping processing, i.e., correction processing performed in step S50 of FIG. 8.

FIG. 12 is a flow diagram of an example of tone mapping processing, i.e., correction processing performed in step S50 of FIG. 8. Steps S51, S52, S53, and S54 of FIG. 12 correspond to steps S101, S102, S103, and S104, respectively, of FIG. 5. Steps S551 and S552 of FIG. 12 correspond to step S105 of FIG. 5.

First, in step S51, the image processing unit 125 acquires the RYeCy image that is output from the image-capturing device 22 or the RYeCy corrected image that is processed in the correction processing of the previous stage. Subsequently, in step S52, the image processing unit 125 converts the RYeCy image into an RGB image represented in the color space of RGB (the YCbCr coordinate system).

Subsequently, in step S53, the image processing unit 125 detects the density of the color of each pixel of the RGB image. Subsequently, in step S54, the image processing unit 125 calculates a tone control intensity a on the basis of the detected density of the color of each pixel. For example, in a case where the tone control processing is uniformly applied to the entirety of the image, there may occur a problem in that, e.g., an area where the color is dense is corrected too brightly, and the color appears to be a fluorescent color. In order to alleviate the occurrence of such a problem, the tone control intensity a that decreases according to an increase in the density of the color is calculated on the basis of the density of the color of each pixel of the RGB image detected in step S53.

In parallel with the processing of steps S52, S53, and S54, the image processing unit 125 performs step S551. In step S551, the image processing unit 125 corrects the brightness of the RYeCy image by using a method such as tone control. For example, in the tone control, a look up table (LUT) is used to correct the brightness of the input pixel value into the brightness of the output pixel value. A graph illustrated at the bottom of FIG. 12 indicates an example of relationship between the input pixel value and the output pixel value included in the LUT.

Then, in step S552, the image processing unit 125 performs the blend processing for blending the RYeCy image before and after the tone control of step S551 on the basis of the tone control intensity a calculated in step S54, and ends the processing as illustrated in FIG. 12. For example, the image processing unit 125 performs, as blend processing, an operation of "α*tone-controlled image+(1−α)*non-tone-controlled image". A symbol "*" indicates multiplication. Accordingly, the correction to a portion where the color is dense can be reduced, so that the area where the color is dense is not corrected too brightly, and the color does not appear to be a fluorescent color.

The density of the color is detected from color difference information Cb, Cr close to the visual characteristics by using the RGB image (the YCbCr coordinate system), so that as compared with the density of the color detected using the RYeCy image, the detection accuracy can be improved. As a result, the calculation accuracy of the tone control intensity a can be improved, and even in a case where the RYeCy image is used, appropriate blend processing can be performed.

Figure 13:
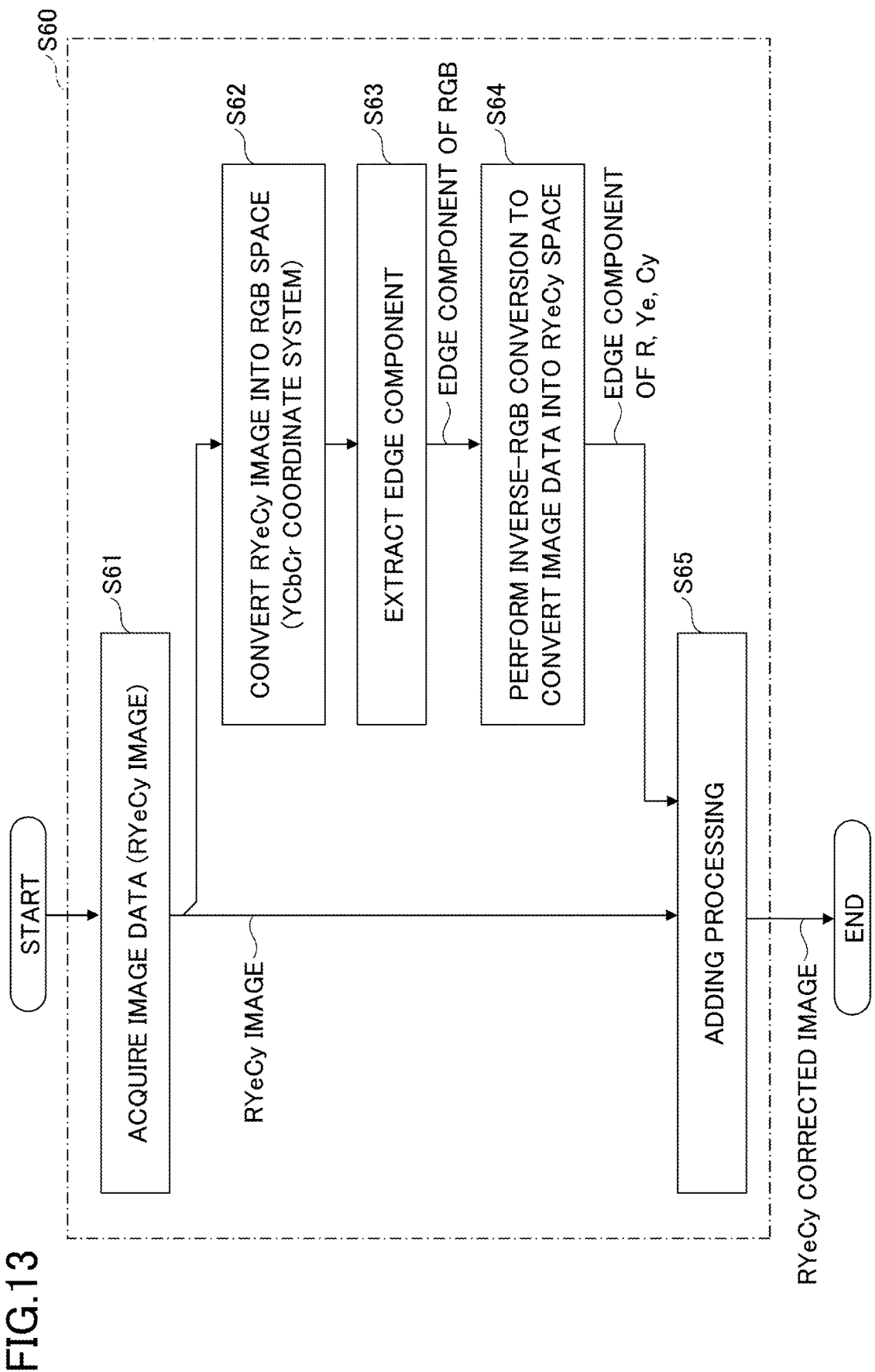
FIG. 13 is a flow diagram of an example of edge enhancement processing, i.e., correction processing performed in step S60 of FIG. 8.

FIG. 13 is a flow diagram of an example of edge enhancement processing, i.e., correction processing performed in step S60 of FIG. 8. Steps S61, S62, S63, S64, and S65 of FIG. 13 correspond to steps S101, S102, S103, S104, and S105, respectively, of FIG. 5.

First, in step S61, the image processing unit 125 acquires the RYeCy image that is output from the image-capturing device 22 or the RYeCy corrected image that is processed in the correction processing of the previous stage. Subsequently, in step S62, the image processing unit 125 converts the RYeCy image into the RGB image represented in the color space of RGB (the YCbCr coordinate system).

Subsequently, in step S63, for example, the image processing unit 125 extracts an edge component from illuminance values (pixel values) of a predetermined number of pixels adjacent to one another in the RGB image converted in step S62. The edge component is extracted from the illuminance information Y by using the RGB image (the YCbCr coordinate system), so that as compared with the case where the edge component is extracted by using the RYeCy image, the extraction accuracy of the edge component can be improved. Furthermore, the edge component is extracted from the illuminance value by using the RGB image, so that the edge enhancement closer to visual characteristics can be performed.

Subsequently, in step S64, the image processing unit 125 performs inverse-conversion to convert the edge component of the RGB space extracted in step S63 into the RYeCy space, and acquires the edge component of R, Ye, and Cy. Subsequently, in step S65, the image processing unit 125 generates an edge-enhanced RYeCy corrected image by adding the edge component of R, Ye, and Cy to the RYeCy image, and ends the processing as illustrated in FIG. 13. In order to reduce the increase of noise caused by the edge enhancement, quasi-Y, Cb, and Cr may be used for the edge enhancement, without conversion into an RGB image of a highly accurate color reproducibility.

As described above, in this embodiment, the RYeCy image is converted into the RGB image with a higher color identification accuracy than the RYeCy image, and the correction parameters used for correction of the RYeCy image are calculated by using the RGB image. The correction processing of the RYeCy image is performed by using the color space of RGB of which the luminance is higher than the RGB image, so that as compared with the case where the RYeCy image is directly corrected, the image quality of the RYeCy corrected image can be improved. Specifically, in the correction processing of the RYeCy image that is captured through the RYeCy filter, the RYeCy corrected image of a high image quality can be generated.

Furthermore, for example, inverse-conversion is performed to convert the image data of the RGB space, from which the noise of the color difference information Cb, Cr is removed, into the RYeCy space, and the correction parameters are acquired, so that the RYeCy image in which the color component is accurately reproduced can be generated.

In the noise reduction processing, the noise of the color difference information Cb, Cr that does not include the illuminance information Y and that is closer to the visual characteristics is removed by using the RGB image (the YCbCr coordinate system), so that color noise can be effectively removed. As a result, the RYeCy image in which the color component is accurately reproduced can be generated. Furthermore, an occurrence of a problem that a particular color is excessively erased during reduction of noise can be alleviated.

In the white balance correction processing, the color correction parameters can be derived by using the image data of the RGB space, so that in a case where the RYeCy corrected image is generated, the color correction parameters can be derived to display on the display apparatus 14 or the like the image that appears to be correct in color in an averaged manner.

In the color correction processing, the RGB image is used to confirm the position where each pixel is situated in the RGB space, so that the color correction parameters according to the visual characteristics can be acquired, and the color correction processing more suitable for the acquired color correction parameters can be performed. Furthermore, the data is interleaved in a lattice manner after the RYeCy space is converted into the RGB space, so that the interpolation processing can be performed as intended, and the correct color correction parameters can be acquired.

In the tone mapping processing, the density of the color is detected from color difference information Cb, Cr close to the visual characteristics by using the RGB image (the YCbCr coordinate system), so that as compared with the density of the color detected using the RYeCy image, the detection accuracy can be improved. As a result, the calculation accuracy of the tone control intensity a can be improved, and even in a case where the RYeCy image is used, appropriate blend processing can be performed.

In the edge enhancement processing, the edge component is extracted from the illuminance information Y by using the RGB image (the YCbCr coordinate system), so that as compared with the case where the edge component is extracted by using the RYeCy image, the extraction accuracy of the edge component can be improved. Furthermore, the edge component is extracted from the illuminance value by using the RGB image, so that the edge enhancement closer to visual characteristics can be performed.

Second Embodiment

Figure 14:
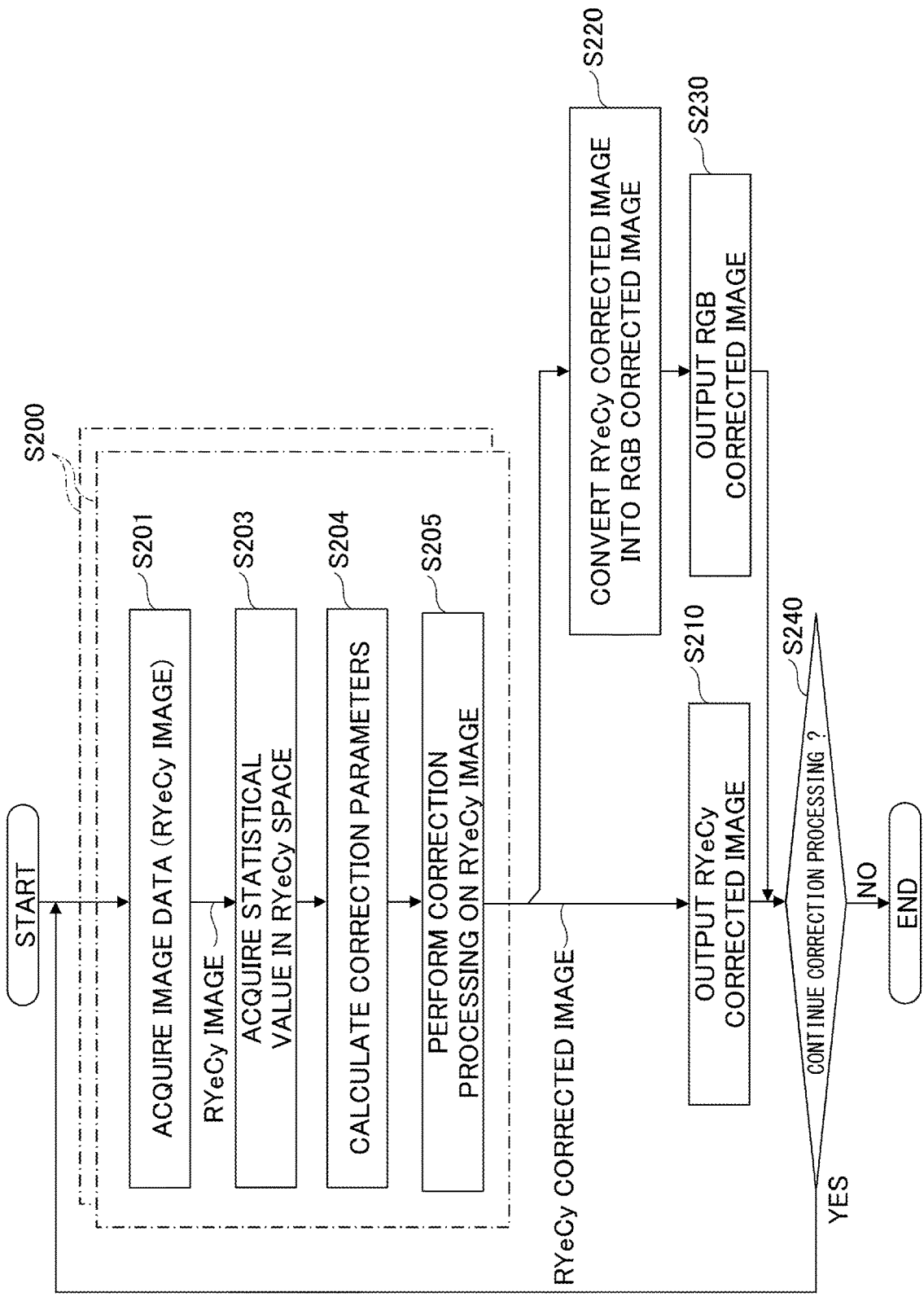
FIG. 14 is a flow diagram of an example of processing performed by an image processing unit implemented on an image processing device according to a second embodiment.

FIG. 14 is a flow diagram of an example of processing performed by an image processing unit implemented on an image processing device according to a second embodiment. The image processing device and the image processing unit according to this embodiment are substantially the same as, for example, the image processing device 12 and the image processing unit 125 as illustrated in FIG. 4. Also, for example, similar to the image processing system 10 as illustrated in FIG. 1, the image processing system including the image processing device 12 according to this embodiment includes an image processing device 12, a display apparatus 14, and an information processing device 16, and is implemented on the moving object 20 such as an automobile.

The processing as illustrated in FIG. 14 is performed by the image processing unit 125 of FIG. 4. Detailed explanation about processing that is substantially the same as the processing of FIG. 5 is omitted. The processing in steps S201, S210, S220, S230, and S240 is substantially the same as the processing in steps S101, S110, S120, S130, and S140, respectively, of FIG. 5.

In this embodiment, similar to FIG. 5, the image processing unit 125 receives the image data represented in the color space of RYeCy that is output from the image-capturing device 22, and performs at least one type of correction processing in step S200. However, after step S201, the image processing unit 125 acquires, in step S203, the statistical value by using the image data represented in the color space of RYeCy. Furthermore, after step S203, the image processing unit 125 calculates, in step S204, the statistical value (a statistical amount) of, e.g., signal values indicative of the intensities of the pixels of R, Ye, and Cy with respect to the entire range or a predetermined partial range of the RYeCy image. Specifically, the image processing unit 125 calculates the correction parameters without generating the image data represented in the color space of RGB.

Then, after step S204, the image processing unit 125 uses the correction parameters calculated in step S204 to perform the correction processing of the RYeCy image obtained in step S201 to generate corrected image data represented in the color space of RYeCy (the RYeCy corrected image). Thereafter, similar to FIG. 5, the image processing unit 125 performs the processing of steps S210, S220, S230, and S240.

As described above, in this embodiment, the image processing unit 125 does not perform the conversion into the RGB image in order to calculate the correction parameters, and therefore, as compared with FIG. 5, the load of processing performed by the image processing unit 125 can be reduced.

Third Embodiment

Figure 15:
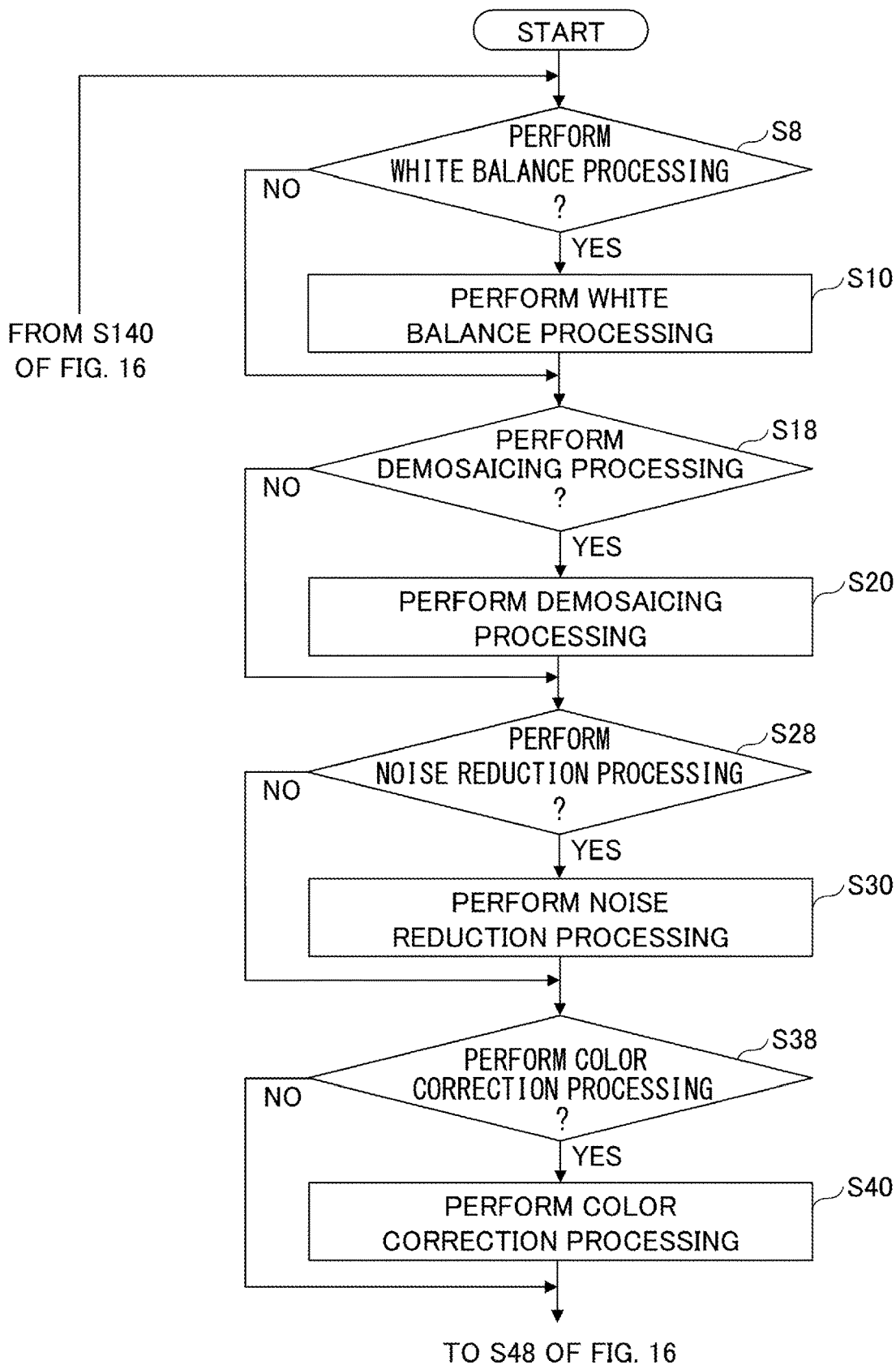
FIG. 15 is a flow diagram of an example of processing performed by an image processing unit provided in an image processing device according to a third embodiment.
Figure 16:
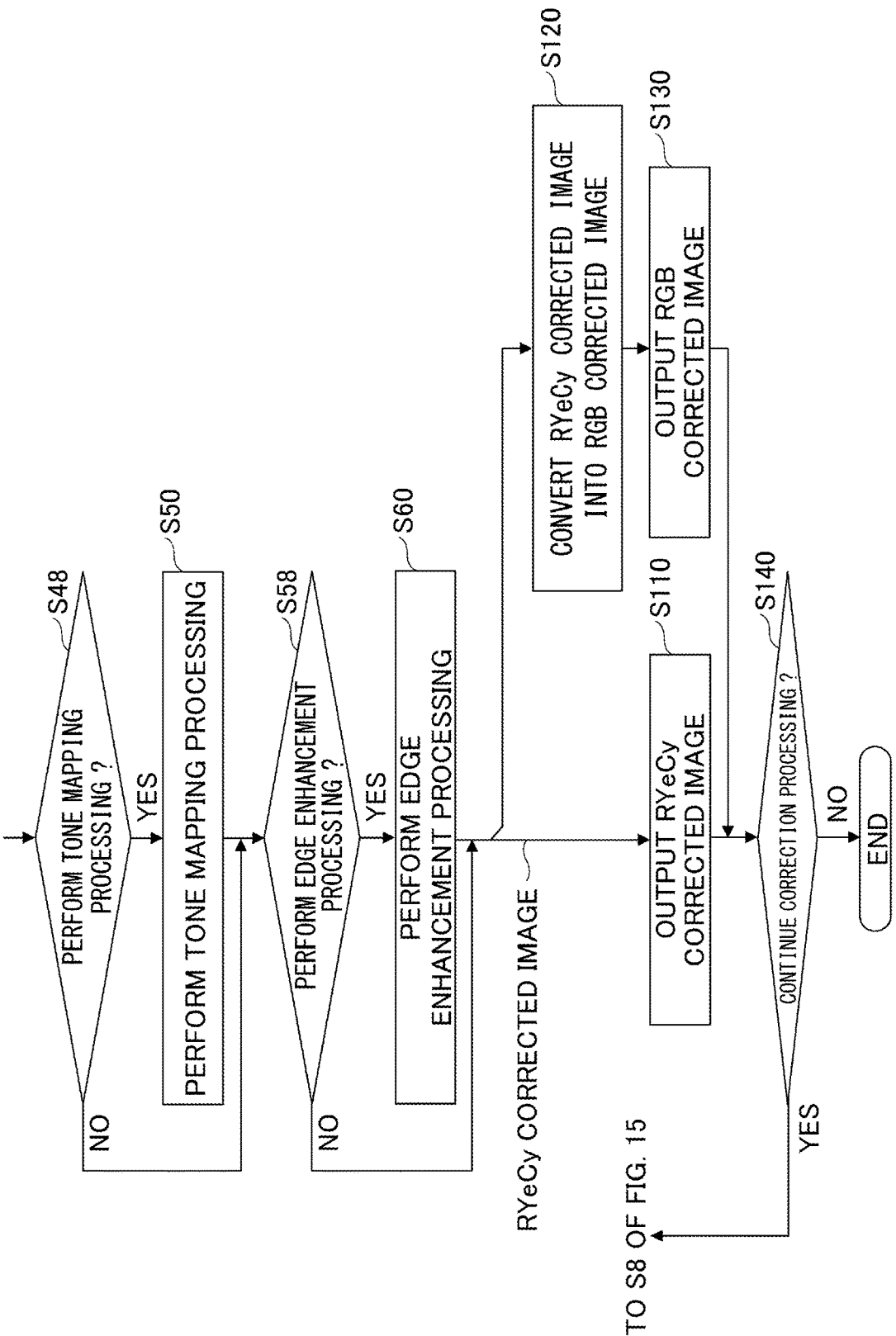
FIG. 16 is a flow diagram of a sequel to FIG. 15.

FIGS. 15 and 16 are flow diagrams of an example of processing performed by an image processing unit provided in an image processing device according to a third embodiment. The image processing device and the image processing unit according to this embodiment are substantially the same as, for example, the image processing device 12 and the image processing unit 125 as illustrated in FIG. 4. Also, for example, similar to the image processing system 10 as illustrated in FIG. 1, the image processing system including the image processing device 12 according to this embodiment includes an image processing device 12, a display apparatus 14, and an information processing device 16, and is mounted on the moving object 20 such as an automobile.

The processing as illustrated in FIG. 15 and FIG. 16 is performed by the image processing unit 125 of FIG. 4. Detailed explanation about processing that is substantially the same as the processing of FIG. 8 is omitted. The processing in steps S10, S20, S30, S40, S50, and S60 is substantially the same as the processing in steps S10, S20, S30, S40, S50, and S60, respectively, of FIG. 8. The processing in steps S110, S120, S130, and S140 is substantially the same as the processing in steps S110, S120, S130, and S140, respectively, of FIG. 8.

In this embodiment, before the processing of steps S10, S20, S30, S40, S50, and S60, the image processing unit 125 determines whether each processing is to be performed, and performs only processing that is determined to be performed. For example, the image processing unit 125 determines whether each processing is to be performed according to a value of a register, a value of a flag, or the like provided in the image processing device 12 in association with the processing.

In step S8 of FIG. 15, the image processing unit 125 performs the white balance processing of step S10 only in a case where the white balance processing is determined to be performed. The white balance processing of step S10 is substantially the same as the white balance processing of FIG. 9. In step S18, the image processing unit 125 performs the demosaicing processing of step S20 only in a case where the demosaicing processing is determined to be performed. The demosaicing processing of step S20 is substantially the same as the demosaicing processing of FIG. 10.

In step S28, the image processing unit 125 performs the noise reduction processing of step S30 only in a case where the noise reduction processing is determined to be performed. The noise reduction processing of step S30 is substantially the same as the noise reduction processing of FIG. 6. In step S38, the image processing unit 125 performs the color correction processing of step S40 only in a case where the color correction processing is determined to be performed. The color correction processing of step S40 is substantially the same as the color correction processing of FIG. 11.

In step S48 of FIG. 16, the image processing unit 125 performs the tone mapping processing of step S50 only in a case where the tone mapping processing is determined to be performed. The tone mapping processing of step S50 is substantially the same as the tone mapping processing of FIG. 12. In step S58, the image processing unit 125 performs the edge enhancement processing of step S60 only in a case where the edge enhancement processing is determined to be performed. The edge enhancement processing of step S60 is substantially the same as the edge enhancement processing of FIG. 13.

Therefore, in this embodiment, substantially the same effects as the effects obtained from the above-described embodiments can be obtained. Furthermore, in this embodiment, processing of any given combination can be performed flexibly on the basis of the register value, the flag value, or the like. Therefore, regardless of the type of processing to be performed, substantially the same hardware of the image processing unit 125 can be used. For example, even in a case where the image processing unit 125 is implemented with an application specific integrated circuit (ASIC), processing of any combination can be flexibly performed with a single ASIC. Because the image processing unit 125 can be commonly used, the cost of the image processing device 12 on which the image processing unit 125 is implemented can be reduced, and the cost of the image processing system 10 can be reduced.

Although the present invention has been described above with reference to the above-described embodiments, the present invention is not limited to the features described in these embodiments. These features can be changed without departing from the gist of the present invention, and can be appropriately determined according to the implementation to which the present invention is applied.

According to the disclosed technique, correction processing of image data captured through a color filter including segments of a red color and at least one complementary color can be performed appropriately.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing device for performing correction processing on original image data generated by an image-capturing element configured to receive light with a plurality of pixels through a color filter including segments of a red color and at least one complementary color, the image processing device comprising a processing circuitry being configured to perform operations including:
    converting the original image data into primary color-based image data represented in a primary color-based color space;
    acquiring a statistical value of a plurality of pieces of pixel data corresponding to the plurality of pixels from the primary color-based image data;
    calculating a correction parameter by using the statistical value; and
    correcting the original image data based on the correction parameter,
        wherein the correcting comprises a first correction processing and a second correction processing, the second correction processing being performed subsequently to the first correction processing, and
        in the second correction processing, corrected image data generated in the first correction processing is corrected.

2. The image processing device according to claim 1, wherein the correcting comprises converting the correction parameter into a correction parameter represented in a color space of the original image data, and thereafter correcting the original image data by using the converted correction parameter.

3. The image processing device according to claim 1, wherein the corrected image data generated in the second correction processing is converted into primary color-based image data represented in the primary color-based color space,
    the converted primary color-based image data is output as data for display, and
    the corrected image data generated in the second correction processing is output as data for image processing.

4. The image processing device according to claim 1, wherein the first correction processing or the second correction processing is noise reduction processing,
    the converting comprises converting the original image data into primary color-based image data represented as illuminance information and color difference information,
    the acquiring comprises performing noise reduction on the color difference information of the primary color-based image data to generate primary color-based image data from which color noise is removed,
    the calculating comprises converting the primary color-based image data from which the color noise is removed into a color space of the original image data to acquire a difference from the original image data as color noise in the color space of the original image data, and
    the correcting comprises subtracting the color noise in the color space of the original image data from the original image data.

5. The image processing device according to claim 1, wherein the first correction processing or the second correction processing is white balance correction processing,
    the acquiring comprises calculating a statistical value of a color of the primary color-based image data into which the original image data is converted,
    the calculating comprises calculating a first color correction parameter by using the statistical value, and
    the correcting comprises correcting a white balance of the original image data by using the first color correction parameter.

6. The image processing device according to claim 1, wherein the first correction processing or the second correction processing is color correction processing,
    the acquiring comprises deriving positions of pixel values of the plurality of pixels in the primary color-based color space by using the primary color-based image data into which the original image data is converted,
    the calculating comprises acquiring a second color correction parameter based on the positions of the pixel values of the plurality of pixels in the primary color-based color space, and
    the correcting comprises correcting a color of the original image data by using the second color correction parameter.

7. The image processing device according to claim 1, wherein the first correction processing or the second correction processing is tone mapping processing,
    the converting comprises converting the original image data into primary color-based image data represented as illuminance information and color difference information,
    the acquiring comprises detecting densities of colors of the plurality of pixels in the primary color-based image data,
    the calculating comprises calculating a tone control intensity, based on the detected densities of colors of the plurality of pixels, and
    the correcting comprises performing blending processing for performing tone control on the original image data based on the tone control intensity to yield tone-controlled original image data and blending the original image data and the tone-controlled original image data.

8. The image processing device according to claim 1, wherein the first correction processing or the second correction processing is edge enhancement processing, the converting comprises converting the original image data into primary color-based image data represented as illuminance information and color difference information, the acquiring comprises detecting an edge component from pixel values of the plurality of pixels in the primary color-based color space, the calculating comprises converting the edge component of the primary color-based image data into a color space of the original image data to acquire an edge component of the original image data, and the correcting comprises adding the edge component in the color space of the original image data to the original image data.

9. The image processing device according to claim 1, wherein the correcting comprises correcting the original image data generated by the image-capturing element configured to receive the light through the color filter including segments of red, yellow, and cyan.

10. The image processing device according to claim 1, wherein the correcting comprises correcting the original image data generated by the image-capturing element configured to receive the light through the color filter including segments of magenta, yellow, and cyan.

11. An image processing method performed by an image processing device for performing correction processing on original image data generated by an image-capturing element configured to receive light with a plurality of pixels through a color filter including segments of a red color and at least one complementary color, the image processing method comprising:

converting the original image data into primary color-based image data represented in a primary color-based color space;

acquiring a statistical value of a plurality of pieces of pixel data corresponding to the plurality of pixels from the primary color-based image data;

calculating a correction parameter by using the statistical value; and correcting the original image data based on the correction parameter, wherein the correcting comprises a first correction processing and a second correction processing, the second correction processing being performed subsequently to the first correction processing, and in the second correction processing, corrected image data generated in the first correction processing is corrected.

* * * * *